United States Patent
Shin et al.

(10) Patent No.: US 9,076,361 B2
(45) Date of Patent: Jul. 7, 2015

(54) DISPLAY APPARATUS AND CONTROLLING METHOD THEREOF

(71) Applicant: SAMSUNG ELECTRONICS CO., LTD., Suwon-si (KR)

(72) Inventors: Sun-hwa Shin, Suwon-si (KR); Dae-ki Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 13/720,113

(22) Filed: Dec. 19, 2012

(65) Prior Publication Data

US 2013/0169608 A1   Jul. 4, 2013

(30) Foreign Application Priority Data

Dec. 29, 2011  (KR) .................. 10-2011-0146201
Dec. 29, 2011  (KR) .................. 10-2011-0146558
Apr. 20, 2012  (KR) .................. 10-2012-0041697

(51) Int. Cl.
G09G 5/00    (2006.01)
H04N 13/04   (2006.01)
H04N 13/00   (2006.01)

(52) U.S. Cl.
CPC ........... G09G 5/005 (2013.01); H04N 13/0438 (2013.01); H04N 13/0029 (2013.01); H04N 13/045 (2013.01); *H04N 2013/0463* (2013.01); *H04N 2013/0465* (2013.01)

(58) Field of Classification Search
CPC . G09G 5/005; H04N 13/0438; H04N 13/045; H04N 13/0029; H04N 2013/0463; H04N 2013/0465

USPC .......... 348/51, 427, 42, 420, 46, 36, 569, 43, 348/53, 56, 59, 419, 60, 44, 54; 382/103, 382/115, 154; 359/464, 462, 467, 466; 345/475, 427, 208, 419, 581

See application file for complete search history.

(56) References Cited

U.S. PATENT DOCUMENTS

| | | | |
|---|---|---|---|
| 2003/0041333 A1 | 2/2003 | Allen et al. | |
| 2010/0095343 A1 | 4/2010 | Kaihotsu | |
| 2010/0277485 A1* | 11/2010 | Zalewski | 345/502 |
| 2011/0157471 A1* | 6/2011 | Seshadri et al. | 348/564 |
| 2011/0285829 A1* | 11/2011 | Mori et al. | 348/53 |
| 2011/0285833 A1* | 11/2011 | Tsurumoto et al. | 348/56 |
| 2012/0026157 A1* | 2/2012 | Unkel et al. | 345/419 |
| 2012/0056876 A1* | 3/2012 | Lee et al. | 345/419 |
| 2012/0182406 A1* | 7/2012 | Woo | 348/54 |

FOREIGN PATENT DOCUMENTS

JP    2010-93734 A    4/2010

* cited by examiner

*Primary Examiner* — Kent Chang
*Assistant Examiner* — Nelson Rosario
(74) *Attorney, Agent, or Firm* — Sughrue Mion, PLLC

(57) ABSTRACT

An image processing apparatus and a method of controlling the same are provided. The image processing apparatus includes: one or more receiving units which receive a plurality of contents; a signal processing unit which outputs a first image frame by processing first content of the plurality of contents and outputs a second image frame by processing second content of the plurality of contents; an output unit which outputs a plurality of contents views by combining the first image frame and the second image frame; and a control unit which, if a sharing restriction command regarding a first contents view from among the plurality of contents views is obtained, restricts matching of a glasses apparatus with the first contents view.

14 Claims, 8 Drawing Sheets

DISPLAY APPARATUS AND CONTROLLING METHOD THEREOF

CROSS-REFERENCE TO RELATED APPLICATIONS

This application claims priority from Korean Patent Application No. 10-2011-0146558, filed on Dec. 29, 2011 in the Korean Intellectual Property Office, Korean Patent Application No. 10-2011-0146201, filed on Dec. 29, 2011 in the Korean Intellectual Property Office, and Korean Patent Application No. 10-2012-0041697, filed on Apr. 20, 2012 in the Korean Intellectual Property Office, the disclosures of which are incorporated herein by reference.

BACKGROUND

1. Field

Apparatuses and methods consistent with exemplary embodiments relate to a display apparatus and a controlling method thereof, and more particularly, to a display apparatus which may create a multi-purpose-multi-view display environment by restricting or releasing sharing of a contents view from among a plurality of contents views and a controlling method thereof.

2. Description of the Related Art

With the development of digital technology, various types of electronic products have been developed and provided. In particular, various display apparatuses such as televisions, mobile phones, personal computers (PCs), notebook PCs, and personal digital assistants (PDAs), etc., have been widely used in household.

As such display apparatuses have become more widely used, user needs for various operations have also increased. Accordingly, manufacturers have exerted more efforts to meet such user needs by providing products with new operations.

In particular, there are increasing needs for technology which allows a plurality of users to view desired contents through a single display apparatus. A goal of a display apparatus is basically to provide a vivid image to users. To this end, a display apparatus needs to provide as big and clear of an image as possible within a field of vision of viewers. Many personal display apparatuses, such as a PC and a smart phone, also provide various solutions to realize such a goal. However, as a personal display apparatus is designed to be mobile, there is a limit to the size of a display screen, making it difficult to provide an ideal display environment. On the other hand, a public display apparatus such as a television or a big screen does not have the limitation in the delivery of an image that a personal display apparatus has, but cannot provide personalized contents to each viewer. Therefore, a technology for providing contents suitable for each individual, from among various contents, in a vivid image, through a single public display apparatus is required.

In order to use a public display apparatus as a personal display apparatus, various technologies should be converged. That is, such an extension of a public display apparatus should include the operations of a personal display apparatus. To do so, not only the operations of a personal display apparatus, but also an interface, should be considered.

SUMMARY

Aspects of one or more exemplary embodiments relate to a display apparatus which may create a multi-purpose-multi-view display environment by restricting or releasing sharing of a contents view from among a plurality of contents views and a controlling method thereof.

According to an aspect of an exemplary embodiment, there is provided an image processing apparatus including: one or more receiving units which receive a plurality of contents; a signal processing unit which outputs a first image frame by processing first content of the plurality of contents and outputs a second image frame by processing second content of the plurality of contents; an output unit which outputs a plurality of contents views by combining the first image frame and the second image frame; a sync signal generating unit which generates a sync signal to synchronize a first glasses apparatus matched with a first contents view of the plurality of contents views; an interface unit which transmits the sync signal to the first glasses apparatus; and a control unit which, if a sharing restriction command regarding the first contents view is input, restricts matching of a second glasses apparatus with the first contents view.

If a selective sharing restriction command regarding the first contents view from among the plurality of contents views is input, the control unit may restrict matching of other glasses apparatuses selected by a user with the first contents view.

If contents displayed on the first contents view are contents for which sharing restriction is prohibited, the control unit may allow matching of the second glasses apparatus with the first contents view even if the sharing restriction command is input.

If the first contents view for which the sharing restriction command is input is selected by the second glasses apparatus, the control unit may match a second contents view with the second glasses apparatus.

If a sharing restriction releasing command regarding the first contents view is input, the control unit may allow matching of the second glasses apparatus with the first contents view.

The interface unit may receive the sharing restriction command from the first glasses apparatus matched with the first contents view, from among a plurality of glasses apparatuses.

The interface unit may receive an input of the sharing restriction command from an input unit on a main body of the image processing apparatus or a remote controller.

According to an aspect of an exemplary embodiment, there is provided a method for controlling an image processing apparatus, the method including: receiving a plurality of contents; outputting a first image frame by processing first content of the plurality of contents and outputting a second image frame by processing second content of the plurality of contents; outputting a plurality of contents views by combining the first image frame and the second image frame; generating a sync signal to synchronize a first glasses apparatus matched with a first contents view of the plurality of contents views; transmitting the sync signal to the first glasses apparatus; and if a sharing restriction command regarding the first contents view is obtained, restricting matching of second glasses apparatus with the first contents view.

The method may further include, if a selective sharing restriction command regarding the first contents view is obtained, restricting matching of the second glasses apparatus with the first contents view.

The method may further include, if contents displayed on the first contents view are contents for which sharing restriction is prohibited, allowing matching of the second glasses apparatus with the first contents view even if the sharing restriction command is input.

The method may further include, if the first contents view for which the sharing restriction command is input is selected by the second glasses apparatus, matching a second contents views with the second glasses apparatus.

The method may further include, if a sharing restriction releasing command regarding the first contents view is obtained, allowing matching of the second glasses apparatus with the first contents view.

The method may further include receiving the sharing restriction command from the first glasses apparatus matched with the first contents view, from among a plurality of glasses apparatuses.

The method may further include receiving an input of the sharing restriction command from an input unit on a main body of the image processing apparatus or a remote controller.

According to an aspect of another exemplary embodiment, there is provided a method for controlling an image processing apparatus, the method including: outputting a contents views; in response to obtaining a sharing restriction command regarding the contents view, from among the plurality of contents views, restricting matching of a glasses apparatuses with the contents view.

With the above-described features, aspects of one or more exemplary embodiments may restrict or release sharing of one contents view from among a plurality of contents views and thus, create a multi-purpose multi-view display environment.

BRIEF DESCRIPTION OF THE DRAWINGS

These and/or other aspects and advantages will become apparent and more readily appreciated from the following description of exemplary embodiments, taken in conjunction with the accompanying drawings, of which.

DETAILED DESCRIPTION OF EXEMPLARY EMBODIMENTS

Reference will now be made in detail to exemplary embodiments, examples of which are illustrated in the accompanying drawings, wherein like reference numerals refer to like elements throughout. Exemplary embodiments are described below in order to explain aspects with reference to the figures.

Figure 1:
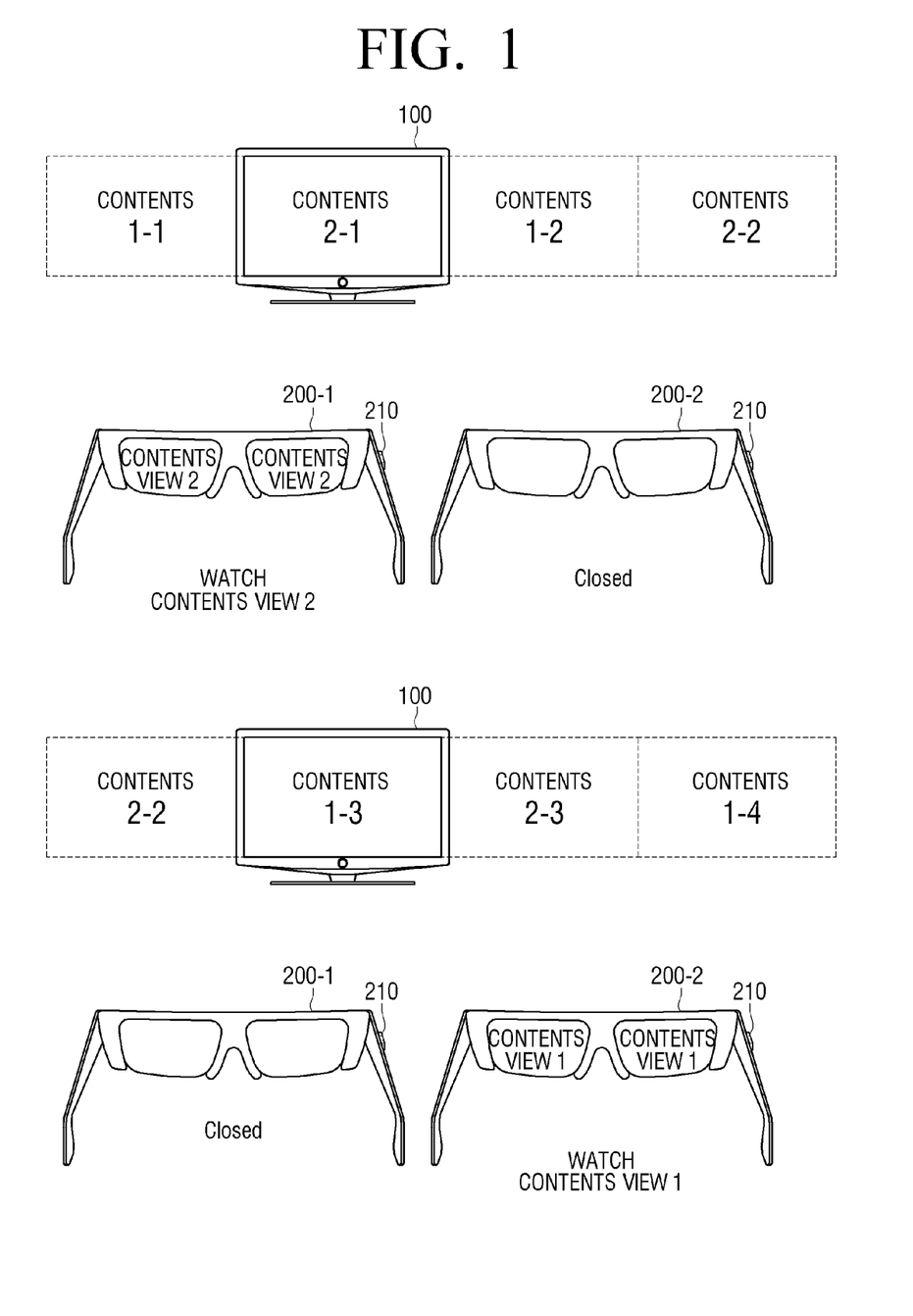
FIG. 1 is a concept view illustrating a principle of operations of a display apparatus and a glasses apparatus according to an exemplary embodiment.
Figure 2:
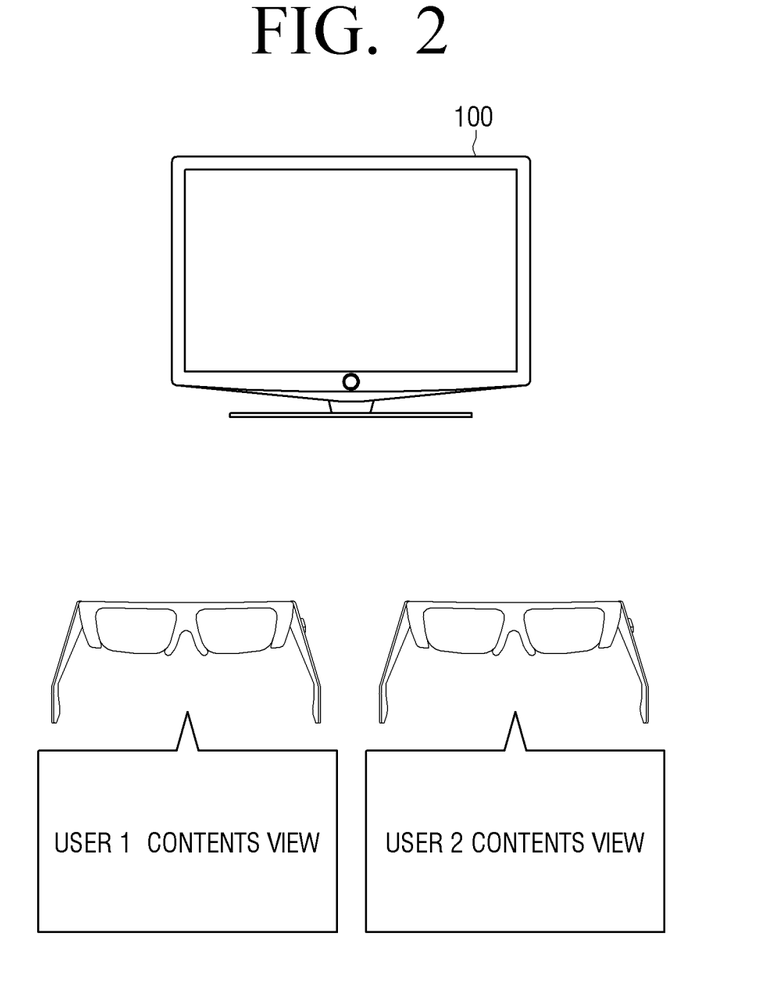
FIG. 2 is a concept view illustrating problems when a single contents view is shared in the display apparatus in FIG. 1.

FIG. 1 is a concept view illustrating a principle of operations of a display apparatus 100 and a glasses apparatus 200-1 and 200-2 according to an exemplary embodiment, and FIG. 2 is a concept view illustrating problems when a single contents view is shared in the display apparatus 100 of FIG. 1.

Referring to FIG. 1, the display apparatus 100 outputs a plurality of contents views by combining image frames of a plurality of different contents, and each of a plurality of glasses apparatuses 200-1, 200-2 is operable to view only a single contents view output by the display apparatus 100. The combining and outputting of image frames alternately outputs image frames of contents. That is, an image frame corresponding to first content is output first and, subsequently, an image frame corresponding to second content is output. The contents view refers to a set of image frames of one content viewable through the glasses apparatus 200-1, 200-2 that is synchronized with the display apparatus 100. Various contents may be viewed through the contents views, but one content can be viewed only through the same contents view.

The present exemplary embodiment relates to a system which alternately outputs image frames of contents and views the image frames using shutter glasses. However, it is understood that one or more other exemplary embodiments are not limited thereto. For example, one or more other exemplary embodiments relate to a polarized system and other types of systems.

In the exemplary embodiment of FIG. 1, the display apparatus 100 alternately displays image frames of different contents 1-4. In this case, two glasses apparatuses 200-1, 200-2 are synchronized with image frames of different contents, respectively. That is, if a first contents view (contents view 2) is viewed through a first glasses apparatus 200-1 and not a second glasses apparatus 200-2, the lenses of the second glasses apparatus 200-2 are closed, so that the first contents view is not viewable through the second glasses apparatus 200-2. Alternately, if the lenses of the second glasses apparatus 200-2 are opened to view a second contents view (contents view 1), the lenses of the glasses apparatus 200-1 which are operable to view the first contents view are closed. As image frames of different contents are displayed alternate at high speed and afterimage effects persist while the lenses are closed, a user may view a natural image.

Meanwhile, one contents view may be shared by a plurality of glasses apparatuses 200-1, 200-2. For example, a plurality of users wearing glasses apparatuses respectively may view a sport game through the same contents view. However, some contents views may have priority or some contents views may be allowed to share contents depending on the characteristics of the contents, an example of which is illustrated in FIG. 2. FIG. 2 illustrates a case where two users are playing a video game through different contents views. When two users are playing a video game with each other, it is desirable to restrict sharing of contents views to make the game more exciting.

Hereinafter, an exemplary embodiment to resolve the above issues will be explained by describing a specific configuration and operation of a display apparatus 100 and a glasses apparatus 200.

Figure 3:
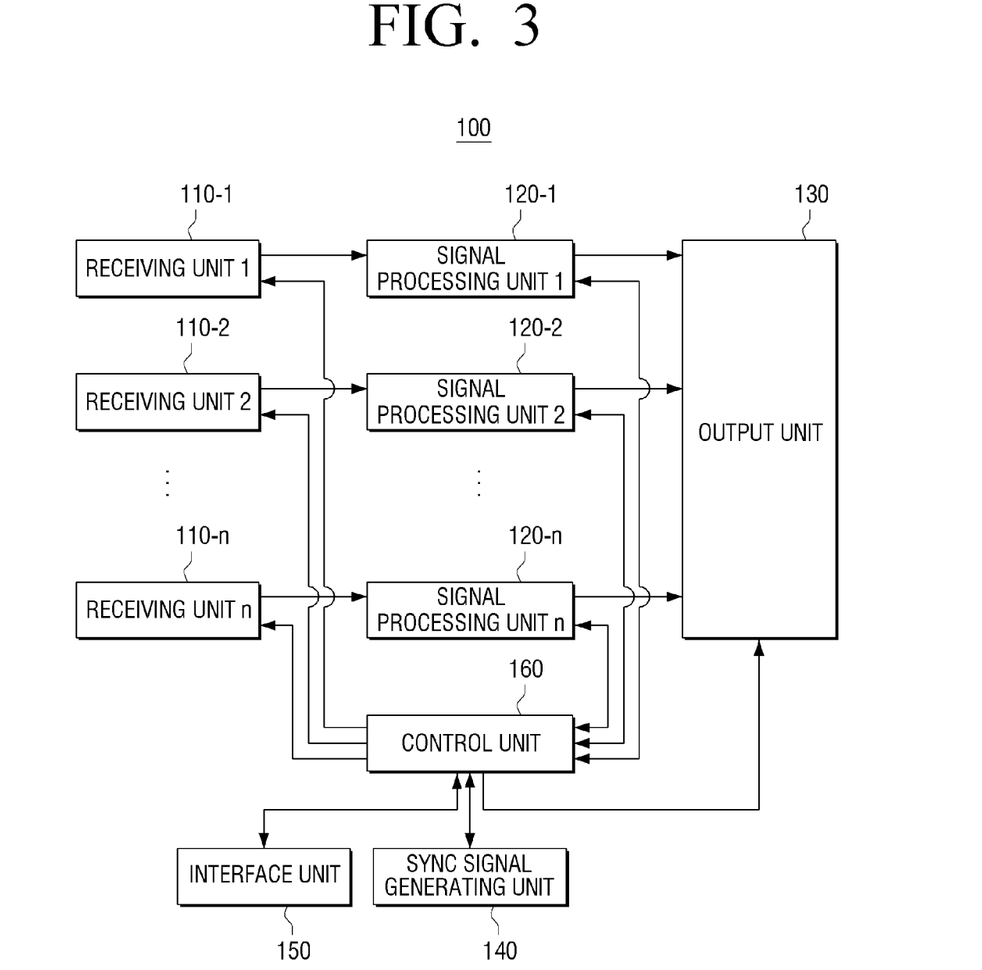
FIG. 3 is a block diagram illustrating a configuration of a display apparatus according to an exemplary embodiment.
Figure 4:
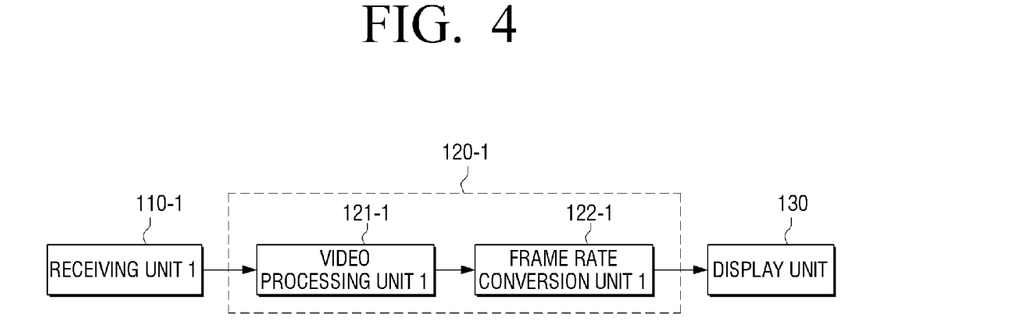
FIG. 4 is a block diagram illustrating configuration of a signal processing unit of the display apparatus in FIG. 3, according to an exemplary embodiment.
Figure 5:
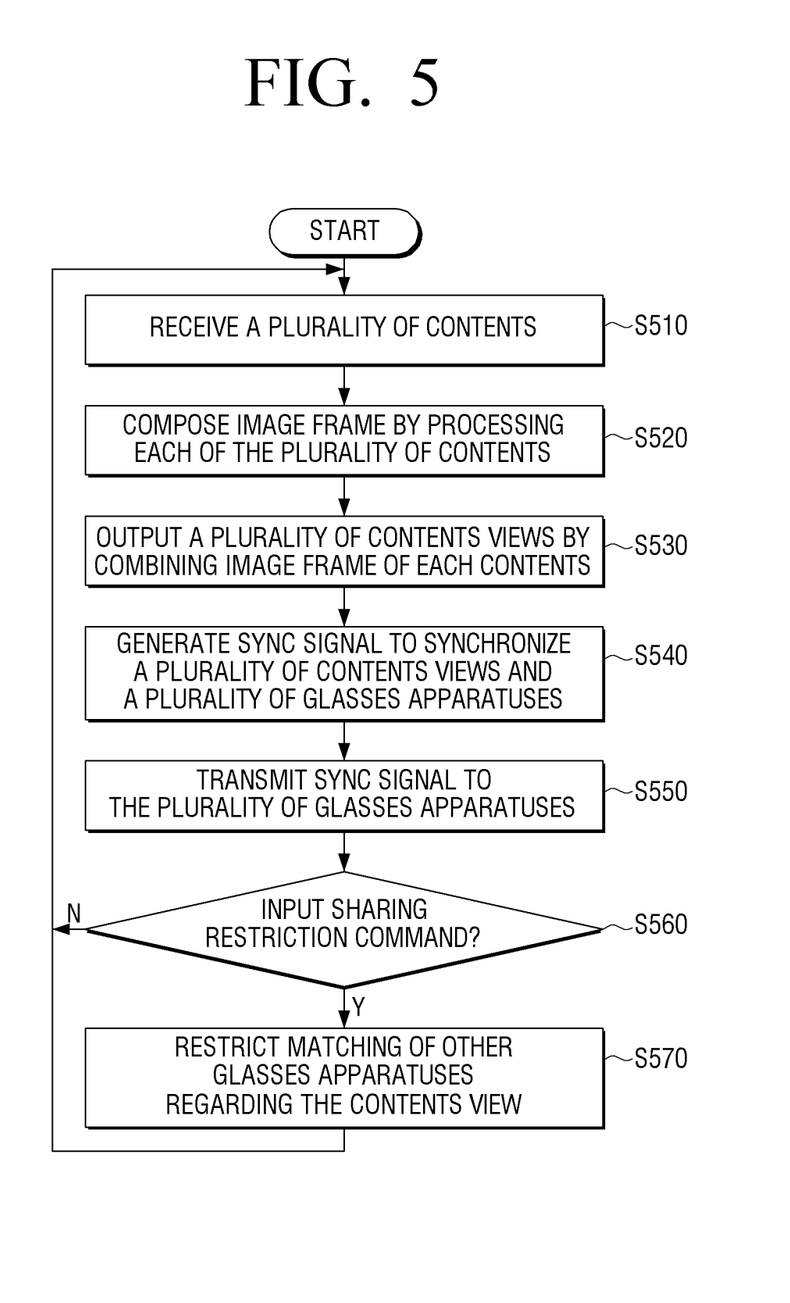
FIG. 5 is a flowchart illustrating a method for controlling the display apparatus in FIG. 3, according to an exemplary embodiment.
Figure 6:
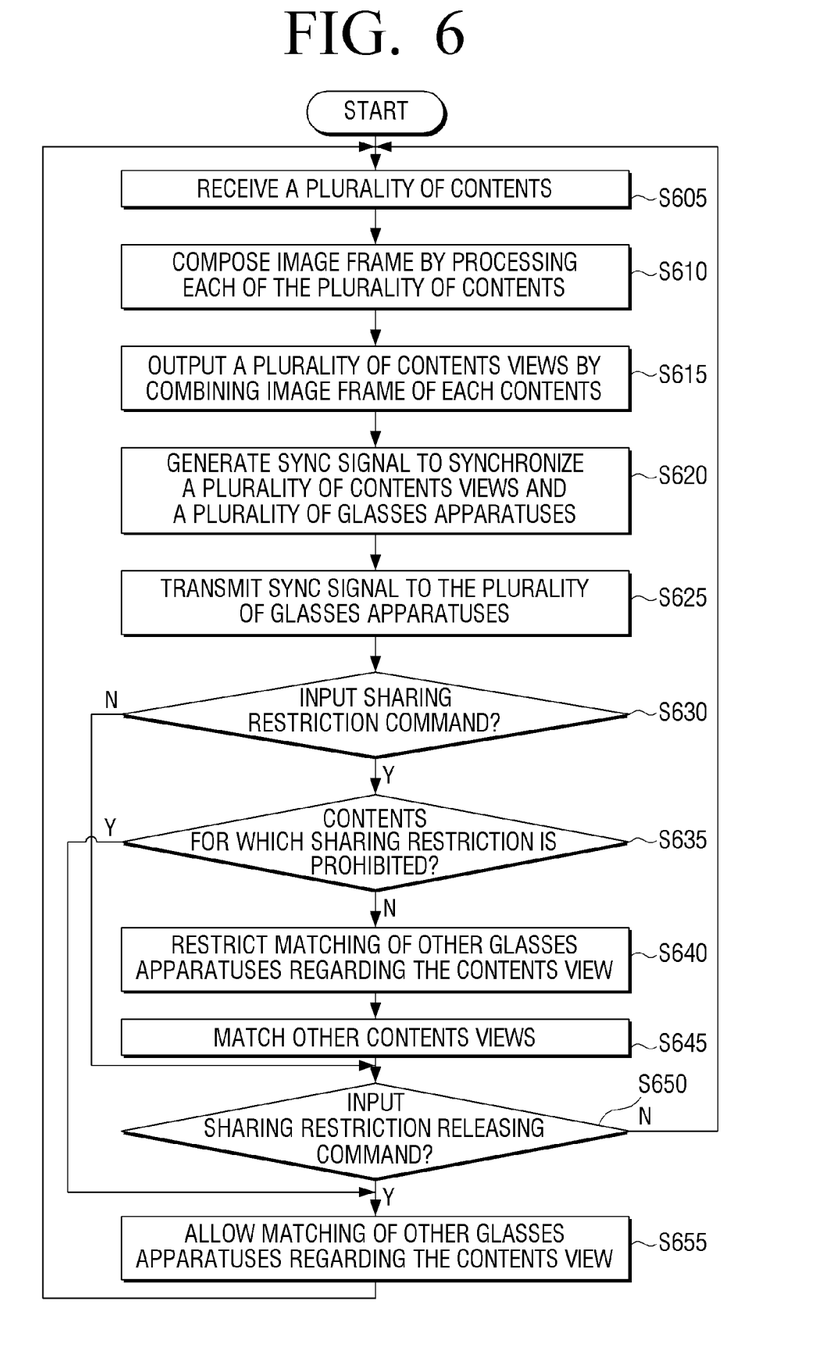
FIG. 6 is a flowchart illustrating a method for controlling a display apparatus according to another exemplary embodiment.

FIG. 3 is a block diagram illustrating configuration of a display apparatus 100 according to an exemplary embodiment, FIG. 4 is a block diagram illustrating a configuration of the signal processing unit 120 of the display apparatus 100 in FIG. 3 according to an exemplary embodiment, FIG. 5 is a flowchart illustrating a method for controlling the display apparatus 100 in FIG. 3 according to an exemplary embodiment, and FIG. 6 is a flowchart illustrating a method for controlling the display apparatus 100 according to another exemplary embodiment.

Referring to FIGS. 3 to 6, the display apparatus 100 according to one or more exemplary embodiments includes a receiving unit 110 to receive contents, a signal processing unit 120 to signal-process the received contents, an output unit 130 to output the signal-processed contents, a sync signal generating unit 140 to generate a sync signal, an interface unit 150 to communicate with the glasses apparatus 200, a storage unit 190 to store control operation information, and a control unit 160 to control the display apparatus 100. The display apparatus 200 may be realized as various apparatuses having a display unit, such as a television, a mobile phone, a personal digital assistant (PDA), a notebook personal computer (PC), a workstation, a monitor, a tablet PC, an electronic book, an electronic album, a kiosk, etc.

The receiving unit 110 receives transmitted contents. Contents may be received in various ways. For example, broadcast program contents may be received from a broadcast station using a broadcast network or from a web server using the Internet. In addition, the display apparatus 100 may receive contents from various recording medium reproduction apparatuses within the display apparatus 100 or connected to the display apparatus 100. The recording medium reproduction apparatus refers to an apparatus which reproduces contents stored in various types of recording media such as a compact disc (CD), a digital versatile disc (DVD), a hard disk, a Blu-ray disk, a memory card, a universal serial bus (USB) memory, etc.

In one or more exemplary embodiments, there may be a plurality of receiving units 110-1, 110-2, . . . , 110-$n$ as illustrated in FIG. 3, or there may be a single receiving unit. In this case, a plurality of contents may be received through a plurality of receiving units 110-1, 110-2, . . . , 110-$n$, and the contents are signal-processed by a plurality of signal processing units 120-1, 120-2, . . . , 120-$n$ and then displayed.

In the case where contents are received from a broadcast station, the plurality of receiving units 110-1, 110-2, . . . , 110-$n$ may configured to include a tuner (not shown), a demodulator (not shown), and an equalizer (not shown). Alternatively, in the case where contents are received from a source such as a web server, the plurality of receiving units 110-1, 110-2, . . . , 110-$n$ may be realized as a network interface card (not shown). In a case where contents are received from the various types of recording medium reproduction apparatuses, the plurality of receiving units 110-1, 110-2, . . . , 110-$n$ may be realized as an interface unit (not shown) connected to the recording medium reproduction apparatuses. As such, the plurality of receiving units 110-1, 110-2, . . . , 110-$n$ may be realized as various forms in one or more exemplary embodiments.

The plurality of receiving units 110-1, 110-2, . . . , 110-$n$ may not necessarily receive contents from the same type of source, and may receive contents from different types of source. For example, the receiving unit 1 (110-1) may be configured to include a tuner, a demodulator, and an equalizer, and the receiving unit 2 (110-2) may be realized as a network interface card. It is understood that the receiving unit of other exemplary embodiments is not limited to that of the present exemplary embodiment described above.

The signal processing unit 120 composes or processes image frames of contents received from the receiving unit. As illustrated in FIG. 3, there may be a plurality of signal processing units 120-1, 120-2, . . . , 120-$n$ corresponding to a plurality of receiving units 110-1, 110-2, . . . , 110-$n$. That is, the plurality of signal processing units 120-1, 120-2, . . . , 120-$n$ compose image frames by processing each of the contents received from the plurality of receiving units 110-1, 110-2, . . . , 110-$n$. A detailed description of the plurality of signal processing units 120-1, 120-2, . . . , 120-$n$ will be provided with reference to FIG. 4.

FIG. 4 is a block diagram to explain a detailed configuration of a signal processing unit 120-1 according to one or more exemplary embodiments. As illustrated in FIG. 4, the signal processing unit 1 (120-1) includes a video processing unit 1 (121-1) and a frame rate conversion unit 1 (122-1). Although only one signal processing unit 1 (120-1) is illustrated in FIG. 4, other signal processing units 120-2, . . . , 120-$n$ may be realized to have the same or similar configuration as that in FIG. 4.

The video processing unit 1 (121-1) performs signal-processing with respect to video data included in contents received from the receiving unit 1 (110-1). Specifically, the video processing unit 1 (121-1) may include a decoder (not shown) to perform decoding with respect to video data and a scaler (not shown) to perform up or down scaling to fit a screen size.

In addition, the video processing unit 1 (121-1) may convert video data to a data format corresponding to the frame rate conversion unit 1 (122-1). Specifically, if input video data is a top-to-bottom format while the frame rate conversion unit 1 (122-1) processes a frame to a side-by-side format, the video processing unit 1 (121-1) may convert image frames of each of the contents to a side-by-side format by connecting them in a horizontal direction.

The frame rate conversion unit 1 (122-1) converts a frame rate of contents provided by the video processing unit 1 (121-1) in accordance with a multi-contents display rate by referring to an output rate of the display apparatus 100. Specifically, if the display apparatus operates at 60 Hz, the frame rate conversion unit 1 (122-1) may convert a frame rate of each contents to be n×60 Hz.

The output unit 130 outputs a plurality of contents views by alternately outputting image frames of each of the contents processed by the plurality of signal processing units 120-1, 120-2, . . . , 120-$n$. The output unit 130 multiplexes and displays image frames such that image frames of each of the contents provided by the plurality of signal processing units 120-1, 120-2, . . . , 120-$n$ are output alternately at lease by one image frame. In some cases, the output unit 130 may perform up or down scaling with respect to image frames of each of the contents so that the image frames may fit a screen size.

For example, in the case of a display apparatus using a shutter glasses method, the output unit 130 outputs and displays image frames so that an image frame of the first contents, an image frame of the second contents, . . . , and an image frame of the nth contents may be alternated at least by one image frame. A user wears the glasses apparatus 200 which is interlocked with a time when a specific contents view is output and thus, may view a desired contents view. Specifically, the glasses apparatus 200 includes a left-eye shutter and a right-eye shutter. The left-eye shutter and the right-eye shutter are turned on/off alternately when three-dimensional (3D) contents are viewed, but as described above, the glasses apparatus 200 are turned on/off altogether in accordance with an output timing of a contents view which is synchronized with the glasses apparatus 200. Accordingly, a user may view a contents view separately from other users.

As described above, a mode where image frames of each of the contents are disposed and alternately output may be referred to as a multi-view mode (or a dual-view mode).

The display apparatus 100 may process contents by activating only one of the plurality of receiving units 110-1, 110-2, ..., 110-*n* in a general mode (or a single-view mode) where only one of two-dimensional (2D) contents and 3D contents is output. If a user selects a multi-view mode while the apparatus operates in a general mode, the display apparatus 100 may activate the remaining receiving units to process data in the above-described way.

Meanwhile, the above-mentioned contents may be 2D contents or 3D contents. 3D contents refer to contents which create a stereoscopic effect by using multi-perspective images which represent the same object from different perspectives.

If a plurality of 3D contents are used, the output unit 130 may multiplex left-eye images and right-eye images included in each of 3D contents provided by the plurality of frame rate conversion units 122-1, 122-2, ..., 122-*n* in a predetermined disposition form and dispose the multiplexed images alternately with image frames of other contents.

Accordingly, a left-eye image and a right-eye image of the first contents, a left-eye image and a right-eye image of the second contents, ..., and a left-eye image and a right-eye image of the nth contents are output and displayed sequentially, and a user may recognize a left-eye image and a right-eye image of one contents view through the glasses apparatus 200.

Meanwhile, albeit not illustrated in FIG. 3, the display apparatus 100 may further include the feature of providing audio data included in each contents view differently for each user while the apparatus operates in a multi-view mode. That is, the display apparatus 100 may further include a de-multiplexer (not shown) to divide contents received from each receiving unit 110-1, 110-2, ..., 110-*n* into video data and audio data, an audio decoder (not shown) to decode the divided audio data, and a modulator (not shown) to modulate each of the decoded audio data to signals with different frequencies, and the output unit 130 may transmit each of the modulated audio data to respective glasses apparatuses. Each of the audio data output from the output unit 130 is provided to a user through an output unit mounted on the glasses apparatus, such as an earphone.

Meanwhile, if additional information such as an electronic program guide (EPG) and subtitles is included in the contents, a de-multiplexer may further separate the additional data from the contents. In addition, the display apparatus 100 may add image frames corresponding to subtitles which are processed to be displayed through an additional data processing unit (not shown).

The sync signal generating unit 140 generates a sync signal which synchronizes the glasses apparatus 200 corresponding to each of the contents in accordance with a display timing of each of the contents. That is, the sync signal generating unit 140 generates a sync signal to synchronize the glasses apparatus 200 with a display timing of image frames of each of the contents in a multi-view mode.

The interface unit 150 communicates with the glasses apparatus 200. In this case, the communication interface unit 150 may transmit a sync signal to the glasses apparatus 200 or pair with the glasses apparatus 200 by communicating with the glasses apparatus 200 in various wireless ways.

For example, the communication interface unit 150 may communicate with the glasses apparatus 200 by having a Bluetooth communication module and generate a sync signal as a transmission stream in accordance with the Bluetooth communication standard to be transmitted to the glasses apparatus 200.

The transmission stream is synchronized with a display timing of contents and includes time information to open/close shutters of the glasses apparatus 200. Specifically, the time information includes information regarding an offset time to open a left-eye shutter, an offset time to close the left-eye shutter, an offset time to open a right-eye shutter, and an offset time to close the right-eye shutter glasses.

The offset time is information regarding delayed time from a reference time set for each of the contents to a point of time when shutter glasses are open or closed. That is, the glasses apparatus 200 opens/closes the left-eye shutter and the right-eye shutter if an offset time elapses from a reference time.

For example, the reference time may be a point of time when a vertical sync signal (that is, a frame sync) occurs in an image frame. The information regarding a reference time may be included in a transmission stream, and the glasses apparatus 200 may set a point of time when a vertical sync signal to open/close the shutters based on the information regarding the reference time.

In addition, the transmission stream may further include information regarding a frequency of a frame sync and if the frequency of the frame sync has a decimal point, information regarding the decimal point.

Meanwhile, the communication interface unit 150 performs pairing according to a Bluetooth communication method by transmitting/receiving a Bluetooth device address and a pin code to/from each glasses apparatus 200.

Once pairing is completed, the communication interface unit 150 may register information regarding each glasses apparatus 200, such as identification information regarding the glasses apparatus. Accordingly, the interface unit 150 matches a display timing of contents with information regarding the glasses apparatus 200, and transmits a transmission stream to the glasses apparatus 200 based on the information obtained through the pairing. Once the transmission stream is received, the glasses apparatus 200 may check a display timing corresponding to the information of its own glasses apparatus 200 and may open or close shutters according to the display timing.

In the above-described exemplary embodiment, the interface unit 150 and the glasses apparatus 200 perform communication according to a Bluetooth communication method, but this is only an example. That is, communication methods other than Bluetooth, such as an infrared communication and Zigbee, can be used, and communication may be performed according to various communication methods which enable transmission/reception of signals by forming a short-distance communication channel.

Hereinafter, the control unit 160 will be explained. The control unit 160 controls the overall operations of the display apparatus 100 according to an exemplary embodiment. In particular, if a command to restrict sharing of one contents view from among a plurality of contents views is received, matching of the contents view by other glasses apparatuses is restricted. The command for restricted sharing is a command to prohibit matching of a glasses apparatus regarding a certain contents view, and if the command for restricted sharing is executed, the corresponding contents view cannot be accessed by other glasses apparatuses. Referring to the video game in FIG. 2 as an example, if the command for restricted sharing is input from a glasses apparatus which is matched with the contents view of user 1, none of the other glasses apparatuses may access the contents view of user 1. Likewise, if the command for restricted sharing is input from a glasses apparatus which is matched with the contents view of user 2, none of the other glasses apparatuses, including the glasses apparatus matched with the contents view of user 1, may access the contents view of user 2.

In some cases, a user may wish to restrict sharing of the contents view he or she is viewing by a specific user. In this case, the user may input a command to selectively restrict sharing of the contents view, which prohibits matching of only a specific glasses apparatus instead of all other glasses apparatuses. For example, a user may wishes to show a movie that he or she is watching to friend A and friend B but not to friend C. In this case, the user may input the selective sharing restriction command which prohibits only matching of the glasses apparatus of friend C. If the selective sharing restriction command which prohibits matching of a certain glasses apparatus regarding a contents view is input, the control unit 160 prohibits matching of the selected glasses apparatus.

According to characteristics of contents, the restricted sharing may not be applied. For example, in the case where the display apparatus 100 and the glasses apparatus 200 are used for educational purpose, the glasses apparatus 200 for students may be matched only with a contents view for students where answers to questions are not displayed, not with a contents view for teachers where answers to questions are displayed. Accordingly, the sharing restriction command regarding the contents view for teachers may be input, and the glasses apparatus for students cannot be matched with the contents view for teachers. On the other hand, teachers should be able to view the contents view for students to explain to the students what is displayed on the contents view. Thus, the glasses apparatus for teachers should be allowed to access the contents view for students. Therefore, even if the sharing restriction command regarding the contents view for students is input, the sharing of the contents view is not restricted. That is, even if the sharing restriction command is input, the control unit 160 allows matching of the glasses apparatus for teachers with the contents view for students.

If the restriction of sharing is set, the control unit 160 may operate in various ways. First of all, as mentioned above, the contents view for which the restriction of sharing is set is not allowed to be matched with other glasses apparatus 200. If the contents view for which the restriction of sharing is set is selected by another glasses apparatus 200, another contents view may be matched with the glasses apparatus 200. In this case, the glasses apparatus 200 may be matched with a contents view which is similar to the contents view originally selected by the glasses apparatus 200. For example, if a contents view regarding a movie is the originally desired contents view, another contents views regarding a movie may be selected and matched with.

If a command to release the restriction of sharing regarding a specific contents view is input, the control unit 160 allows the matching of the specific contents view with other glasses apparatuses. In the above-described exemplary embodiment, the students wearing the glasses apparatus for students should be able to have a test through the contents view for students and view a display screen where the answers are displayed through the contents view for teachers. Therefore, if a command to release the restriction of sharing regarding the contents view for teachers is input, the glasses apparatus for students can be matched with the contents view for teachers, and the students wearing the glasses apparatus may also view the display screen where the answers are displayed.

Figure 7:
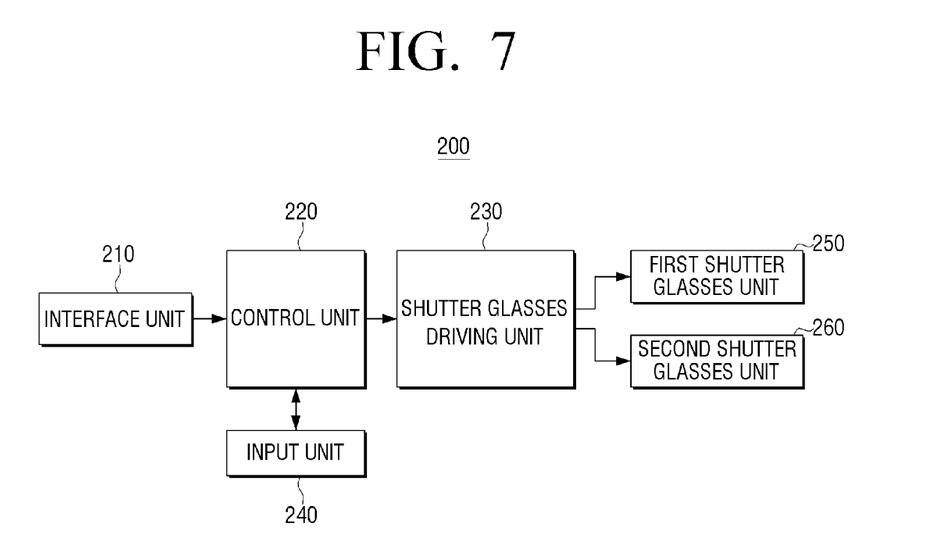
FIG. 7 is a block diagram to explain configuration of a glasses apparatus according to an exemplary embodiment.

Meanwhile, the sharing restriction command or the sharing restriction releasing command may be input in various ways. For example, the glasses apparatus 200 may receive the sharing restriction command or the sharing restriction releasing command through an input unit 240, which will be explained below, and transmit the received command to the display apparatus 100 through an interface unit 210. The display unit 150 of the display apparatus 100 receives the sharing restriction command or the sharing restriction releasing command. In addition, the display unit 150 of the display apparatus 100 may transmit such a command through a remote controller (not shown) or input such a command directly through a key (not shown) on the main body of the display apparatus 100.

In addition, the control unit 160 controls the receiving unit 110 and the signal processing unit 120 to respectively receive and signal-process contents, and controls the sync signal generating unit 140 to control overall operations of the display apparatus 100, such as performing synchronization.

Hereinafter, a method for controlling the display apparatus 100 according to one or more exemplary embodiments will be explained with reference to FIGS. 5 and 6. As the specific configuration and operations have already been explained above, the overall operations will be explained briefly.

The receiving unit 110 of the display apparatus 100 receives a plurality of contents (operation S510, operation S605), and the signal processing unit 120 composes (or processes or generates) image frames by processing each of the plurality of contents (operation S520, operation S610). The output unit 130 outputs a plurality of contents views by combining image frames of each of the contents (operation S530, operation S615), and the sync signal generating unit 140 generates a sync signal to respectively synchronize the plurality of contents views and the plurality of glasses apparatuses 200 (operation S540, operation S620). Subsequently, the interface unit 150 transmits a sync signal to a plurality of glasses apparatuses (operation S550, operation S625). If a sharing restriction command is input while a plurality of contents views are output as described above (operation 5560-Y, operation 5630-Y), it is determined whether the corresponding contents are subject to the sharing restriction (operation S635). If sharing restriction setting is allowed for the corresponding contents (operation S635-N), matching of other glasses apparatuses with the corresponding contents view is restricted (operation S640), while another contents view may be matched with a requesting glasses apparatus (operation S645). However, if setting of sharing restriction is not allowed for the corresponding contents (operation 5635-Y), matching of other glasses apparatuses with the contents view is allowed (operation S655). If a sharing restriction releasing command is input (operation 5650-Y), matching of other glasses apparatuses with the contents view is allowed (operation S570, operation S655).

FIG. 7 is a block diagram to explain a configuration of a glasses apparatus 200 according to an exemplary embodiment. By way of example, the glasses apparatus 200 in FIG. 7 is interlocked with the display apparatus 100 in FIG. 3 which outputs a plurality of contents alternately by image frame unit. The glasses apparatus 200 includes an input unit 240, a shutter glasses driving unit 230, a communication interface unit 210, a first shutter glasses unit 250, and a second shutter glasses unit 260.

The input unit 240 receives a sharing restriction command, a selective sharing restriction command, or a sharing restriction releasing command. The input unit 240 of a glasses apparatus 200 which is matched with a contents view from among a plurality of contents views receives a sharing restriction command or a selective sharing restriction command and the interface unit 210 transmits the received command to the display apparatus 100. If a sharing restriction command is input, matching of other glasses apparatuses 200 with the corresponding contents view is restricted. On the other hand, if a selective sharing restriction command is input, matching of a selected glasses apparatus 200 with the corresponding contents view is prohibited. If a sharing restriction releasing command is input to the input unit 240 of a glasses apparatus 200 which is matched with a contents view with sharing restriction or selective sharing restriction, the command is transmitted to the display apparatus 100 via the interface unit 210 and sharing restriction of the corresponding contents view is released.

The interface unit 210 communicates with the display apparatus 100. The communication interface unit 210 may be realized as a Bluetooth communication module, communicates with the display apparatus 100 to receive a sync signal, and receives a response to a control command such as whether to agree with a control command regarding the display apparatus 100. In addition, as described above, the interface unit 210 may transmit a sharing restriction command, a selective sharing restriction command, or a sharing restriction releasing command input through the input unit 240 to the display apparatus 100.

As described above, a sync signal may be received in the form of a transmission stream according to the Bluetooth communication standard and may include time information to open or close the first shutter glasses unit 250 and the second shutter glasses unit 260 of the glasses apparatus 200 by being synchronized with a display timing of contents. As the information included in the transmission stream has already been explained above with reference to FIG. 4, further explanation will not be provided.

A control unit 220 controls overall operations of the glasses apparatus 200. In particular, the control unit 220 controls the operations of the shutter glasses driving unit 230 by transmitting a sync signal received from the interface unit 210 to the shutter glasses driving unit 230. That is, the control unit 220 controls the shutter glasses driving unit 230 to generate a driving signal to drive the first shutter glasses unit 250 and the second shutter glasses unit 260 based on the sync signal. In addition, the control unit may control the interface unit 210 to transmit a sharing restriction command, a selective sharing restriction command, or a sharing restriction releasing command input through the input unit 240 to the display apparatus 100.

The shutter glasses driving unit 230 generates a driving signal based on a sync signal received from the control unit 220. In particular, the shutter glasses driving unit 230 may open the first shutter glasses unit 250 and the second shutter glasses unit 260 according to a display timing of one of a plurality of contents views displayed on the display apparatus 100.

The first shutter glasses unit 250 and the second shutter glasses unit 260 open or close shutters according to a driving signal received from the shutter glasses driving unit 230. Specifically, the first shutter glasses unit 250 and the second shutter glasses unit 260 open shutters simultaneously when one of a plurality of contents views is displayed and closes the shutters together when other contents views are displayed. Accordingly, a user wearing the glasses apparatus 200 may view one content.

Meanwhile, in the case of 3D contents, the first shutter glasses unit 250 and the second shutter glasses unit 260 may alternately open/close each of shutters. That is, the first shutter glasses unit 250 may be opened at a display timing of a left-eye image corresponding to one 3D contents and the second shutter glasses unit 260 may be opened at a display timing of a right-eye image according to a driving signal.

The display apparatus 100 that receives a command to convert contents transmits a transmission stream including information regarding a display timing of other available contents other than the one that a user is currently watching to the glasses apparatus 200 in a sequential manner. The control unit 220 may receive a sync signal corresponding to other contents and control the shutter glasses driving unit 230 to generate a driving signal sequentially based on a sync signal corresponding to each of the contents. Accordingly, the first shutter glasses unit 250 and the second shutter glasses unit 260 are opened whenever the image frames of each of the contents are opened, and a user may view all of the contents sequentially.

Meanwhile, in the present exemplary embodiment, the display apparatus 100 generates a sync signal corresponding to a display timing of the contents respectively and transmits the sync signal to the glasses apparatus 100, though it is understood that one or more other exemplary embodiments are not limited thereto.

The display apparatus 100 may generate a sync signal corresponding to a display timing of each of the contents as a single transmission stream according to the Bluetooth communication standard. That is, the display apparatus 100 may generate a single transmission stream which includes time information to open/close shutters of a glasses apparatus by being synchronized with a display timing of the first contents, time information to open/close shutters of a glasses apparatus by being synchronized with a display timing of the second contents, . . . , and time information to open/close shutters of a glasses apparatus by being synchronized with a display timing of nth contents.

In this case, the display apparatus 100 may generate a transmission stream by matching a display timing of each of the contents to information regarding the glasses apparatus 200. For example, the display apparatus 100 may match information regarding different glasses apparatuses to each of the contents according to the arrangement order of image frames of the contents. That is, if two contents are provided in a multi-view mode, the image frames of the first, third, . . . , nth contents may be matched to the information regarding the first glasses apparatus, and the image frames of the second, fourth, . . . , n+1th contents may be matched to the information regarding the second glasses apparatus (herein, 'n' represents an odd number).

Once a sync signal is received, the glasses apparatus 200 checks a display timing corresponding to the information for itself, and may open or close shutters according to the checked display timing. That is, the glasses apparatus 200 may control the shutter glasses driving unit 230 to generate a driving signal sequentially based on a sync signal corresponding to each of the contents included in a transmission stream. Accordingly, the first shutter glasses unit 250 and the second shutter glasses unit 260 open whenever images frames of each of the contents are displayed.

Meanwhile, the programs for performing the methods according to various exemplary embodiments may be stored in various types of recording medium.

Specifically, a program code for performing the above-mentioned methods may be stored in various types of recording medium readable by a terminal, such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, CD-ROM, etc.

Figure 8:
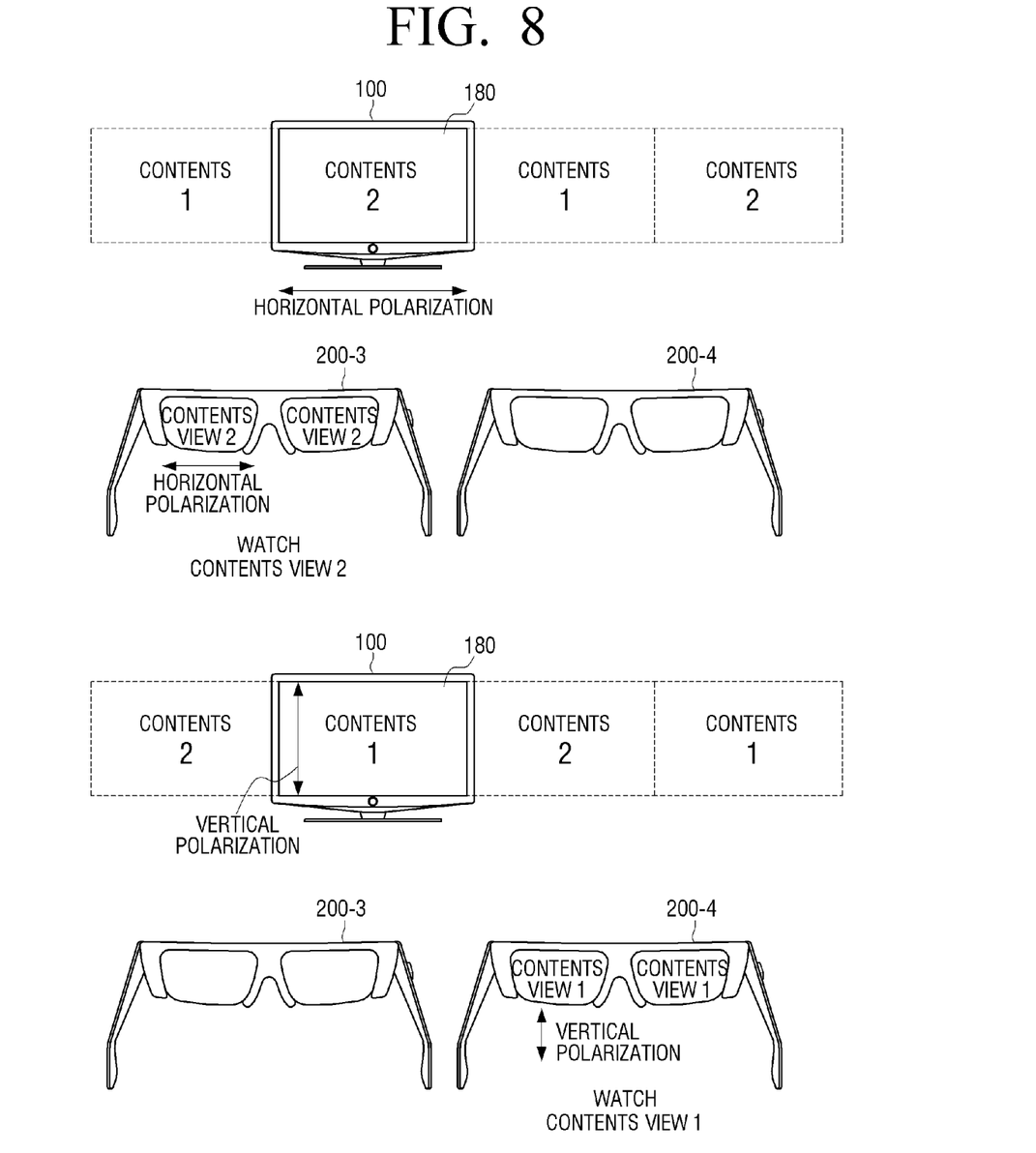
FIG. 8 is a concept view for viewing an image through a glasses apparatus having polarized lenses which are used respectively for cases where image frames of contents polarized in a horizontal direction and a vertical direction are alternately displayed.

Hereinafter, a polarized method according to another exemplary embodiment will be described with reference to FIG. 8. FIG. 8 is a concept view for viewing an image through a glasses apparatus 200 having polarized lenses which are used respectively for the cases where image frames of contents polarized in a horizontal direction and a vertical direction are alternately displayed.

The above-mentioned display apparatus 100 may further include a polarized element 180. The polarized element may include a liquid crystal layer (not shown) to polarize an image. The display apparatus 100 controls the liquid crystal layer by horizontal line or vertical line using a driving voltage of different levels, and polarizes a contents image output from the display apparatus 100 in a specific direction. In this case, the polarized contents image may be provided and output alternately. For example, one content may be polarized and output in a horizontal direction and then, another content may be polarized and output in a vertical direction. This process is repeated. Each image, that is, a contents view may be viewed through a glasses apparatus 200-3 having a horizontally-polarized lens and a glasses apparatus 200-4 having a vertically-polarized lens. In another exemplary embodiment, one image frame may include image information of different contents in different areas. In this case, each area may be polarized and output in a different direction and different contents views may be watched through a glasses apparatus having a lens which is consistent with a respective polarization direction.

In this case, the glasses apparatuses 200-3, 200-4 for viewing the display apparatus 100 may have a polarized lens which is consistent with a polarization direction of contents to be viewed. Accordingly, each glasses apparatus transmits only a polarized image and thus, a user may watch only a desired contents view. As each of the glasses apparatuses 200-3, 200-4 does not require synchronization with the display apparatus 100 separately, costs may be reduced and a flickering effect that may happen during synchronization may also be reduced.

With the above-described features, exemplary embodiments may restrict or release matching of a glasses apparatus with a contents view whenever necessary and thus, create a multi-purpose multi-view display environment for privacy, education, game, etc.

While the above-described exemplary embodiments relate to a display apparatus 100 including a display unit 130, it is understood that other exemplary embodiments are not limited thereto. For example, other exemplary embodiments may be applicable to an image processing apparatus such as a set-top box, a stand-alone control device, an audio/video receiver, an optical media player, an image source, etc. Furthermore, it is understood that in exemplary embodiments, one or more units of the above-described apparatuses 100, 200 can include circuitry, a processor, a microprocessor, etc., and may execute a computer program stored in a computer-readable medium.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A display apparatus, comprising:
a plurality of receiving units which receive a plurality of contents;
a signal processing unit which composes an image frame by processing each of the plurality of contents;
an output unit which outputs a plurality of contents views by combining an image frame corresponding to the each of the plurality of contents;
a sync signal generating unit which generates a sync signal to synchronize a glasses apparatus matched with each of the plurality of contents views;
an interface unit which transmits the sync signal to the glasses apparatus; and
a control unit which, if a sharing restriction command regarding one contents view from among the plurality of contents views is input, restricts matching of other glasses apparatuses with the contents view,
wherein the interface unit receives the sharing restriction command from a glasses apparatus matched with the contents view, from among a plurality of glasses apparatuses.

2. The display apparatus as claimed in claim 1, wherein, if a selective sharing restriction command regarding one contents view from among the plurality of contents views is input, the control unit restricts matching of other glasses apparatuses selected by a user with the contents view.

3. The display apparatus as claimed in claim 1, wherein, if contents displayed on the contents view are contents for which sharing restriction is prohibited, the control unit allows matching of other glasses apparatuses with the contents view even if the sharing restriction command is input.

4. The display apparatus as claimed in claim 1, wherein, if a contents view for which the sharing restriction command is input is selected by other glasses apparatuses, the control unit matches other contents views with the other glasses apparatuses.

5. The display apparatus as claimed in claim 1, wherein, if a sharing restriction releasing command regarding the contents view is input, the control unit allows matching of other glasses apparatuses with the contents view.

6. The display apparatus as claimed in claim 1, wherein the interface unit receives an input of the sharing restriction command from a key formed on a main body of the display apparatus or a remote controller.

7. The display apparatus as claimed in claim 1, wherein the sharing restriction command is input by a user viewing the contents view.

8. A method for controlling a display apparatus, comprising:
receiving a plurality of contents;
composing an image frame by processing each of the plurality of contents;
outputting a plurality of contents views by combining an image frame corresponding to the each of the plurality of contents;
generating a sync signal to synchronize a glasses apparatus matched with the each of the plurality of contents views;
transmitting the sync signal to the glasses apparatus;
if a sharing restriction command regarding one contents view from among the plurality of contents views is input, restricting matching of other glasses apparatuses with the contents view; and
receiving the sharing restriction command from a glasses apparatus matched with the contents view, from among a plurality of glasses apparatuses.

9. The method as claimed in claim 8, further comprising:
if a selective sharing restriction command regarding one contents view from among the plurality of contents views is input, restricting matching of other glasses apparatuses with the contents view.

10. The method as claimed in claim 8, further comprising:
if contents displayed on the contents view are contents for which sharing restriction is prohibited, allowing matching of other glasses apparatuses with the contents view even if the sharing restriction command is input.

11. The method as claimed in claim 8, further comprising:
if a contents view for which the sharing restriction command is input is selected by other glasses apparatuses, matching other contents views with the other glasses apparatuses.

12. The method as claimed in claim 8, further comprising:
if a sharing restriction releasing command regarding the contents view is input, allowing matching of other glasses apparatuses with the contents view.

13. The method as claimed in claim 8, further comprising:
receiving an input of the sharing restriction command from a key formed on a main body of the display apparatus or a remote controller.

14. The method as claimed in claim 8, wherein the sharing restriction command is input by a user viewing the contents view.

\* \* \* \* \*